(12) United States Patent
Yohda et al.

(10) Patent No.: US 6,804,072 B1
(45) Date of Patent: Oct. 12, 2004

(54) RECORDING HEAD CLOGGING DETECTION METHOD AND ITS DEVICE

(75) Inventors: Hiroshi Yohda, Hirakata (JP); Masaru Higashionji, Katano (JP); Haruo Isaka, Yawata (JP); Hideaki Mukae, Sanda (JP); Kouhei Baba, Takatsuki (JP); Kazunori Umee, Ikoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/856,782
(22) PCT Filed: Nov. 26, 1999
(86) PCT No.: PCT/JP99/06636
§ 371 (c)(1),
(2), (4) Date: May 25, 2001
(87) PCT Pub. No.: WO00/33300
PCT Pub. Date: Jun. 8, 2000

(30) Foreign Application Priority Data

Nov. 27, 1998 (JP) .......................................... 10-336408
Mar. 30, 1999 (JP) .......................................... 11-088723

(51) Int. Cl.[7] .............................................. G11B 27/36
(52) U.S. Cl. ....................................................... 360/31
(58) Field of Search ....................................... 360/31, 53

(56) References Cited

U.S. PATENT DOCUMENTS

| | | | | |
|---|---|---|---|---|
| 5,625,503 A | * | 4/1997 | Sasajima | 360/25 |
| 6,215,618 B1 | * | 4/2001 | Anderson et al. | 360/128 |
| 6,629,789 B2 | * | 10/2003 | Kawatoko | 400/74 |

FOREIGN PATENT DOCUMENTS

| | | | |
|---|---|---|---|
| JP | 59-89418 | 6/1984 | |
| JP | 7-121842 | 5/1995 | |
| JP | 7-307016 | 11/1995 | |
| JP | 07-307016 | * 11/1995 | G11B/5/455 |
| JP | 8-329432 | 12/1996 | |
| JP | 10-134323 | 5/1998 | |

* cited by examiner

Primary Examiner—David Hudspeth
Assistant Examiner—Glenda Rodriguez
(74) Attorney, Agent, or Firm—Parkhurst & Wendel, L.L.P.

(57) ABSTRACT

A clogging detector used for a VTR to check the recording state of a recording head without using the reproducing head. A test signal of a lower frequency than the erasing frequency is recorded before and after an information signal by means of an erasing head. Before and after recording the information signal by means of the recording head, the test signal is reproduced, the reproduction output is detected by a detecting circuit, and the level of the output is compared with a preset level by a comparing circuit. When the level is lower than the preset level, a warming is issued from a warming circuit, thus preventing a recording failure due to the clogging of the head.

9 Claims, 17 Drawing Sheets

RECORDING HEAD CLOGGING DETECTION METHOD AND ITS DEVICE

TECHNICAL FIELD

The present invention relates to a device for detecting clogging of a video tape recorder recording head that carries out recording helically with respect to the longitudinal direction by means of a head provided on a rotating cylinder.

BACKGROUND ART

Conventionally, as shown in FIG. 17, a camcoder records by means of a rotating head along a magnetic tape 31 around a cylinder 36. In order to verify the recorded state upon recording, as for a signal recorded on recording tracks 37 of the magnetic tape 31, an information signal 35, which has been recorded by a recording head 33 immediately before, is reproduced by a reproducing head 32 for detecting clogging. The reproducing head 32 is positioned to follow the recording head 33. When a recording failure results from clogging of the head, etc., the clogging is detected immediately and cleaning and so on is performed on the head. Reference numeral 38 denotes a running direction of the magnetic tape 31 and reference numeral 39 denotes a tracing direction of the recording head 33 and so on. An erase head 34 erases an area in advance for recording the information signal 35 ahead of the recording head 33. Thus, it is possible to eliminate the influence of a previously recorded signal.

As equipment decreases in size, a VTR system having a small cylinder diameter has been put into practice. Meanwhile, in accordance with the trend toward high-quality images, the signal transfer rate increases. Hence, it has been necessary to reduce the number of heads per cylinder to maintain the same number of revolutions of the cylinder. Meanwhile, it is difficult to mount a number of sets of heads on a single cylinder where each set includes an erasing head, a recording head, and a reproducing head.

However, regarding a recording/reproducing apparatus, it is quite important for the device to operate normally by recording and verifying the recording. Except in cases where recorded information can be read repeatedly, for example, when recording an event taking place only one time for news reports and so on, it is important to verify the operating state of the recording device upon recording. As a conventional technique for collecting materials for news reports using a camera and a VTR, the following method has been mainly used: just before recording, recording and playback is performed for a short time on a tape to be recorded, and then the recording/reproducing operation is verified. Or a recording head and a reproducing head, which reads recorded information immediately after the recording, are provided in the functionality of the VTR, and the recording operation is verified by reading recorded information while recording.

The above function, which verifies recorded information by performing reproduction immediately after recording, is a function essential to an external memory for a computer and a camcorder for acquisition by broadcasters.

Moreover, as a simple method of verifying the recording operation, the following method has been also adopted as a conventional technique: when the recording operation is verified by reproduction immediately after recording, instead of playback all recorded data to make a comparison with the original data, the presence or absence of an envelope of reproduction output is detected after recording.

As for the verification of the recording function, the method of performing recording and reproducing on a tape just before recording is actually limited by the amount of time available. Additionally, no solutions are possible in the event of a malfunction during the recording process.

Also, when information is read immediately after recording, a reproducing head is necessary for verifying the recording process in addition to a recording head.

In general, a means for achieving high-quality recording/reproducing output is that an erasing head completely demagnetizes a tape just before recording; the tape is initialized; and recording is carried out. Thus, in order to realize more reliable recording, three kinds of heads are necessary which include a recording head, a reproducing head, and an erasing head.

Generally in a VTR using a helical scanning method, by which a tape is wrapped around 180-degrees of the cylinder and is recorded and reproduced, a pair of heads (two heads) are positioned opposing each other at 180-degree angles on the rotary cylinder, and the heads are switched at every half turn for recording. In this case, six heads are necessary in total.

Furthermore, in the case where recorded information has a high data rate and recording is not carried out by a single recording head system but by a two heads system, twelve heads are required in total. Hence, a problem appears in packaging so many heads together. Additionally, in the case of n-channel recording system, since 6×n heads in total need to be installed on the cylinder, it is not possible to mount all the heads when building a VTR.

DISCLOSURE OF INVENTION

An object of the present invention is to provide a recording head clogging detection method, by which the above clogging can be detected without providing a reproducing head for detecting clogging of the recording head. Therefore, the recording head clogging detection method of the present invention is characterized in that an erasing head records a test signal in a specific section of a recording track, evaluation is made on a reproduced test signal obtained by reproducing the test signal in the recording head, and the occurrence of clogging is evaluated. According to the present invention, it is possible to detect the occurrence of clogging of the recording head without the necessity for a reproducing head used for detecting clogging of the recording head.

Furthermore, a preceding first head records sub information in a second area. When a second head records main information in a first area, the sub information is reproduced from the second area. It is possible to detect the presence or absence of adherents on the head based on the reproduction output. Furthermore, at the same time, verification is made on the reliability of the recording operation by verifying recording current, which is applied when the second head records main information. Hence, even if the number of heads installed in a rotary cylinder is reduced, it is possible to verify the recording. Namely, the present invention is realized as follows: regarding contamination (adherent such as tape fillings adhered to a surface of the head) that degrades the reliability of a recording/reproducing system of the tape head, a detection signal is recorded and reproduced in a predetermined area by using the positional relationship between the first head (e.g., an erasing head) and the second head (e.g., a recording head).

The following will discuss the detail of the present invention.

The recording head clogging detection method of the present invention is characterized in that a magnetic recording/reproducing apparatus reproduces from a magnetic tape having an information signal recorded by rotating and scanning the heads in sequence, the signal being provided helically with respect to the longitudinal direction of a magnetic tape. When detecting clogging of a recording head, a test signal is recorded on the magnetic tape by applying current with a frequency lower than an erasing frequency to an erasing head which erases an area for recording an information signal before the recording head records information in a recording track for each recording track, every specified number of two or more recording tracks, or every specified time, at a timing when the erasing head traces a specific section of the area for recording an information signal in the recording track; and the presence or absence of clogging of the recording head is determined by evaluating the reproduced test signal obtained by reproducing the test signal, which is recorded by the erasing head, by means of the recording head.

Moreover, the method of the present invention is characterized in that the specific section for recording a test signal is at least one of the sections in the beginning and the end of the area for recording an information signal in the recording track.

Furthermore, the method of the present invention is characterized in that when a track pitch is W ($\mu$m) and a difference in azimuth angle is θ (radian) between the erasing head and the recording head, a wavelength λ($\mu$m) of the test signal is set longer than λ=πWθ/6.

As described above, according to the recording head clogging detection method of the present invention, the erasing head records a test signal in the specific section of the recording track on the magnetic tape, and the presence or absence of clogging of the recording head is determined by evaluating the reproduced test signal, which is obtained by reproducing the test signal by the recording head. Thus, the following advantageous effects can be achieved: a reproducing head for detecting clogging is not necessary; a surface of the head can be monitored while recording with a small number of heads including the erasing head and the recording head; and recording can be performed positively with a simple cylinder configuration and a small number of rotary transformers.

Additionally, in the magnetic recording/reproducing apparatus which reproduces from the magnetic tape having an information signal recorded by rotating and scanning the heads in sequence, the signal being provided helically with respect to a longitudinal direction of the magnetic tape, a recording head clogging detector of the present invention is characterized by comprising a signal selecting means for selecting an erasing signal and a test signal, which is lower than the erasing signal in frequency, and applying the signals to the erasing head for erasing an area in which the recording head records an information signal. A control means for instructing the signal selecting means to apply the test signal to the erasing head for each recording track, every specified number of two or more recording tracks or every specified time, at a timing when the erasing head traces at least one of the sections in the beginning and end of the area for recording the information signal in the recording track. An evaluation means for determining the presence or absence of clogging of the recording head by evaluating the reproduced test signal obtained by reproducing the test signal, which is recorded by the erasing head, by means of the recording head.

Furthermore, the detector of the present invention is characterized in that when a track pitch is 18 $\mu$m and a difference in azimuth angle is 20° between the erasing head and the recording head, a wavelength of the test signal is set longer than 3 $\mu$m.

A recording verification method of the present invention is associated with a recording/reproducing apparatus in which heads mounted on a rotary cylinder scan a tape in a helical direction, a track is formed on the tape, and information is recorded and reproduced. The heads include a first head and a second head, and the track includes a first area and a second area. The first head erases the first area and records sub information in the second area. The second head records main information in the first area and reproduces sub information of the second area. The reliability of the recording operation is judged based on a first detection signal and a second detection signal. The first detection signal is produced from the sub information reproduced by the second head, and the second detection signal is produced from current applied to the second head when main information is recorded in the first area. Hence, as for the number of heads, only two kinds of a first head (e.g., an erasing head) and a second head (e.g., a recording head) are necessary. Additionally, the sub information recorded by the first head is reproduced by the second head. Thus, in the case where adherents exist on a surface of the first head or the second head, since a reproduction output level of the second head is lowered, a recording failure can be detected. Moreover, verification can be made on an operation of the recording process by verifying the flow of recording current.

The method of the present invention is characterized in that the first head erases the first area and records sub information in the second areas at once on two tracks, the second head records main information in the first area and reproduces the second areas by means of adjacent paired heads on each track, and the second areas are in the beginning and end of the first area.

The present invention includes a method characterized in that out of the paired heads of the second head, the preceding heads reproduce sub information from the second area placed at the beginning of the first area, the subsequent heads reproduce sub information from the second area placed at the end of the first area, and a first detection signal is produced from these pieces of sub information; and a method characterized in that after the preceding heads of the paired heads of the second head record main information, a recording leakage signal of the subsequent heads is reproduced, and a leakage signal of the preceding heads is reproduced before main information is recorded by the subsequent heads of the paired heads of the second head, thereby producing a second detection signal. With the above methods, even in the case where a recording channel is doubled to improve a recording rate and the number of heads increases so as to permit recording with two channels, the recording state can be verified.

Also, the method is characterized in that when the first head and the second head are different in azimuth angle, a track pitch is W, and a difference in azimuth angle is θ, sub information recorded by the first head is substantially a single wavelength λ represented by λ=2×W×tan θ.

Moreover, the method is characterized in that while the second head reproduces sub information, current applied to the first head is interrupted or reduced. Hence, an SN ratio of the detection signal can be improved.

Additionally, the method is characterized in that the second area for recording sub information is equal to or less than 3% of the first area for recording main information. Thus, the ratio can be set within a suitable range relative to a recording density and capacity of detecting a signal.

According to the recording verification method of the present invention, the first head erases the first area and records sub information in the second area, the second head records main information in the first area and reproduces the sub information of the second area, and the reliability of the recording operation is judged based on the sub information reproduced by the second head and recording current upon recording of the second head. Consequently, it is possible to detect a malfunction caused by the recording head in a recording state.

BEST MODE FOR CARRYING OUT THE INVENTION

Referring to FIGS. 1 to 5 showing specific embodiments, a recording head clogging detection method of the present invention will be described below.

Embodiment 1

Figure 1:
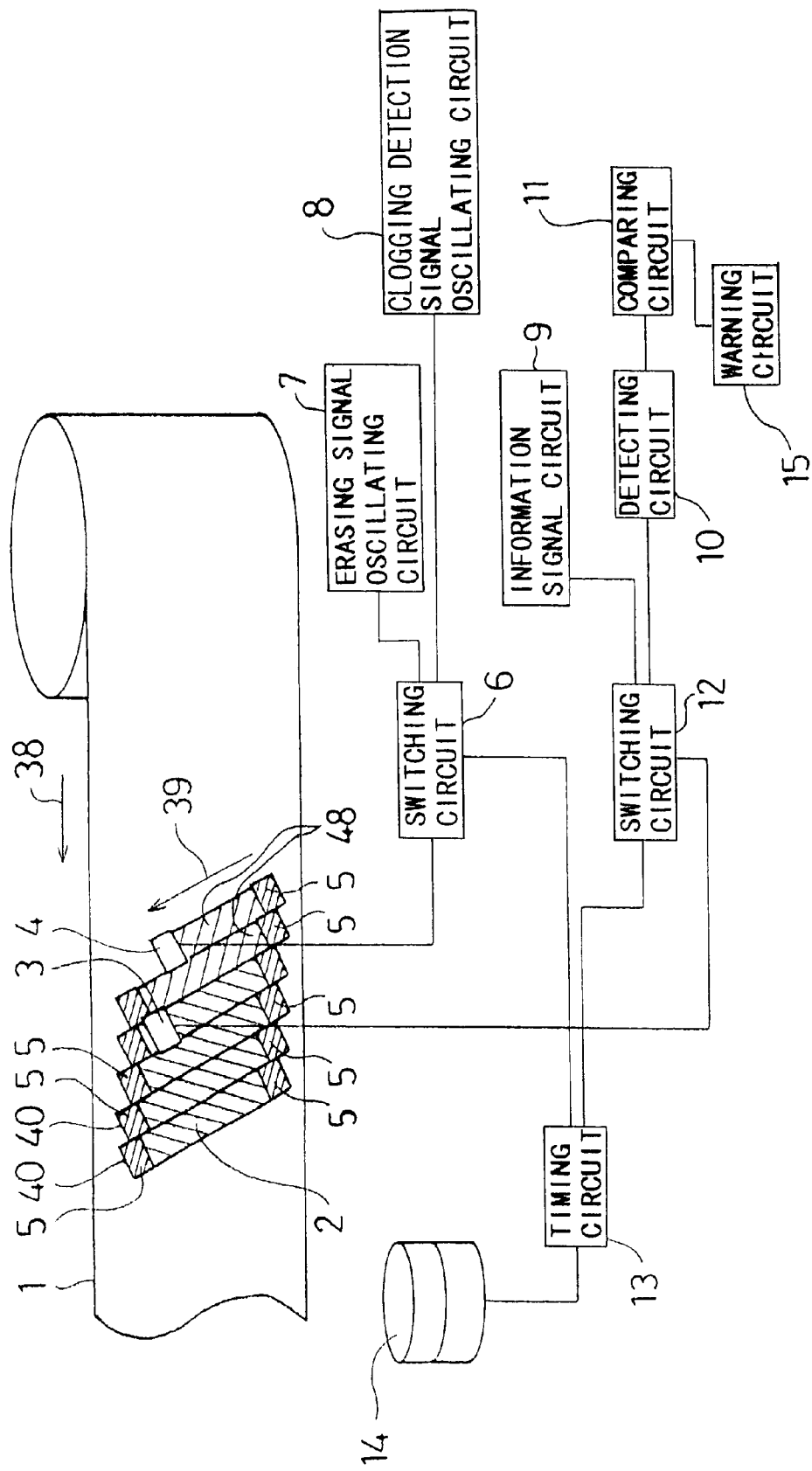
FIG. 1 is a block diagram showing a clogging detector of Embodiment 1 for realizing a recording head clogging detection method of the present invention.

FIG. 1 shows a video tape recorder using a helical scanning method that includes a clogging detector for realizing a recording head clogging detection method of the present invention.

On a magnetic tape 1, which is wrapped around a cylinder 14 and runs in a direction of arrow 38, a recording head 3 traces the magnetic tape 1 in a direction of arrow 39 and records an information signal in each recording track 40. The recording head 3 is included in the cylinder 14 and rotates therein.

An information signal circuit 9, a detecting circuit 10, and a comparing circuit 11 are connected to the recording head 3 via a signal switching circuit 12.

An erasing signal oscillating circuit 7 and a clogging detection signal oscillating circuit 8 are connected to an erasing head 4 via a switching circuit 6.

The information signal circuit 9 is a circuit for modulating a video signal from the outside into an information signal recorded on the magnetic tape 1, and the information signal circuit 9 produces a signal having a band of about 21 MHz. The erasing signal oscillating circuit 7 produces a signal of about 35 MHz. The clogging detection signal oscillating circuit 8 produces a sinusoidal wave signal or a rectangular wave signal of about 1 MHz to 3 MHz as a test signal.

The timing of switching the switching circuits 6 and 12 is instructed by sending a signal from a timing circuit 13 according to the rotating position of the cylinder 14.

The erasing head 4 preceding the recording head 3 erases the position of an information signal 2 on the magnetic tape 1 at a frequency such as 35 MHz, which is sufficiently higher than 21 MHz, a maximum frequency of a digitized information signal. Further, for example, the recording head has an azimuth angle of 20°, the erasing head has an azimuth angle of 0°, and a track pitch is 18 µm.

In erasing areas 48 erased by the erasing head 4, the information signal 2 is recorded by the subsequent recording head 3. The information signal 2 has been outputted from the information signal circuit 9 via the switching circuit 12.

Figure 2:
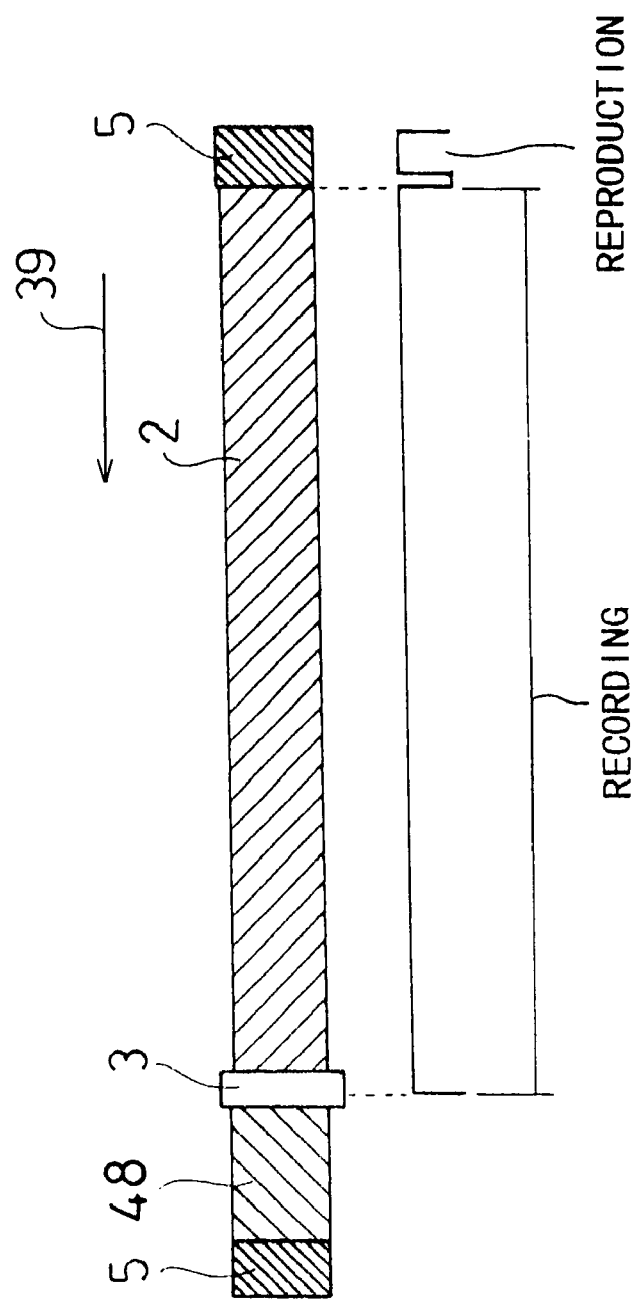
FIG. 2 is an explanatory diagram showing a recording state of the embodiment.

FIG. 2 shows the operation of the recording head 3 upon recording. At the position of a test signal 5, a reproducing operation is carried out as shown in a chart under a track, and the information signal 2 is recorded in the erasing area 48.

Additionally, in response to a signal transmitted from the timing circuit 13 according to the rotating position of the cylinder 14, the output of the clogging detection signal oscillating circuit 8 is switched and applied to the erasing head 4 via the switching circuit 6. A test signal 5 of about 1 MHz to 3 MHz is recorded in specific sections at the beginning and the end of the information signal 2 on the recording track.

Upon reproducing a signal, the recording head 3 is connected to the detecting circuit 10 via the switching circuit 12 before and after recording the information signal 2. At this moment, the recording head 3 reproduces the test signal 5 recorded by the erasing head 4. The reproduced signal is detected by the detecting circuit 10, and then the comparing circuit 11 compares the reproduced signal with an output state of the recording head 3 having a normal state of the surface. In the case where the output decreases below a preset value, a warning is issued from a warning circuit 15, thus preventing a recording failure.

Generally, the erasing head is larger than the recording head in gap length to apply a strong erasing magnetic field deeply in a thickness direction of the tape. Thus, it is difficult to record a short-wavelength signal as compared with a long-wavelength signal. Moreover, when the recording head and the erasing head are different in azimuth angle, in case of using a short-wavelength test signal, the test signal reproduced by the recording head decreases in level due to an azimuth loss. Hence, in view of the output improved by a higher frequency and the output reduced by an azimuth loss, it is preferable that the test signal has a longer wavelength than a zero-output wavelength being subsequent to a zero-output wavelength produced by an azimuth loss.

Figure 3:
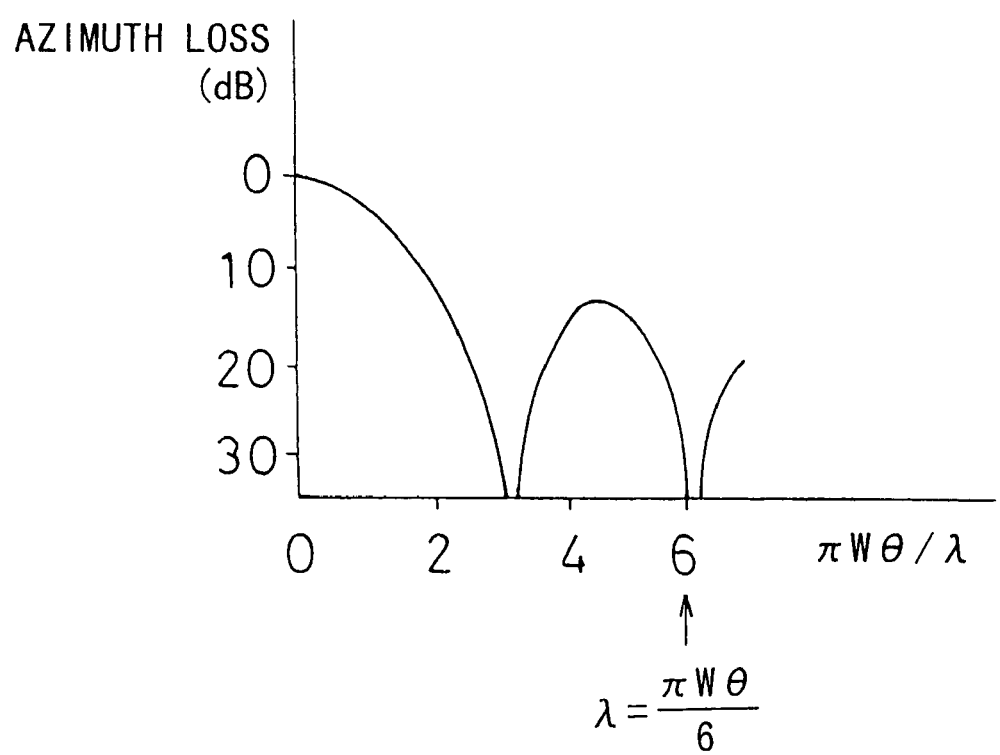
FIG. 3 is a diagram showing a relationship between a wavelength of a test signal and azimuth loss.

For example, in the case where a track pitch is 18 μm and a difference in azimuth angle is 20°, it is preferable that the test signal is 3 μm or longer in wavelength. FIG. 3 shows the relationship between a wavelength and an azimuth loss. A wavelength $\lambda(\mu m)$ of the test signal can be also set longer than $\lambda = \pi W \theta / 6$, where W (μm) represents a track pitch and θ (radian) represents a difference in azimuth angle between the erasing head and the recording head.

Additionally, in the above embodiment, a signal selecting means is composed of the switching circuit 6 and the clogging signal oscillating circuit 8. The signal selecting means selects and applies an erasing signal and a test signal to the erasing head, which erases an area for recording an information signal by means of the recording head. The test signal is lower in frequency than the erasing signal.

A control means is composed of the timing circuit 13. The control means instructs the signal selecting means to apply the test signal to the erasing head when the erasing head traces the sections in the beginning and the end of the area for recording an information signal in each recording track.

An evaluating means is composed of the switching circuit 12, the detecting circuit 10, and the comparing circuit 11. The evaluating means evaluates a reproduction test signal, which is obtained by allowing the recording head to reproduce the test signal recorded by the erasing head, and determines the presence or absence of clogging of the recording head.

Here, in the present embodiment, the test signal 5 is written by the erasing head 4 for each recording track to detect clogging. The following configuration is also applicable: the test signal 5 is written by the erasing head 4 every specified number of two or more recording tracks or every specified time, and clogging is detected.

Further, clogging can be detected by reproducing the test signal 5 on one of the front and the back of the information signal 2.

Embodiment 2

Figure 4:
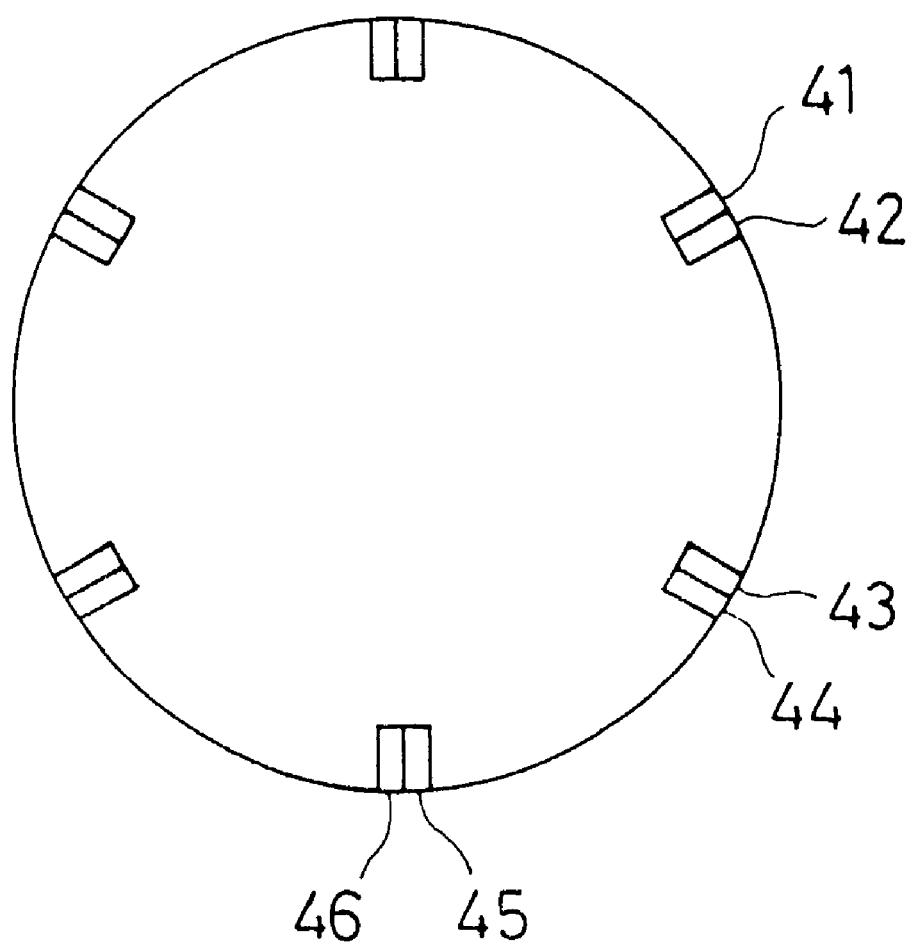
FIG. 4 is a plan view showing a specific layout example of heads on a cylinder according to Embodiment 2.
Figure 5:
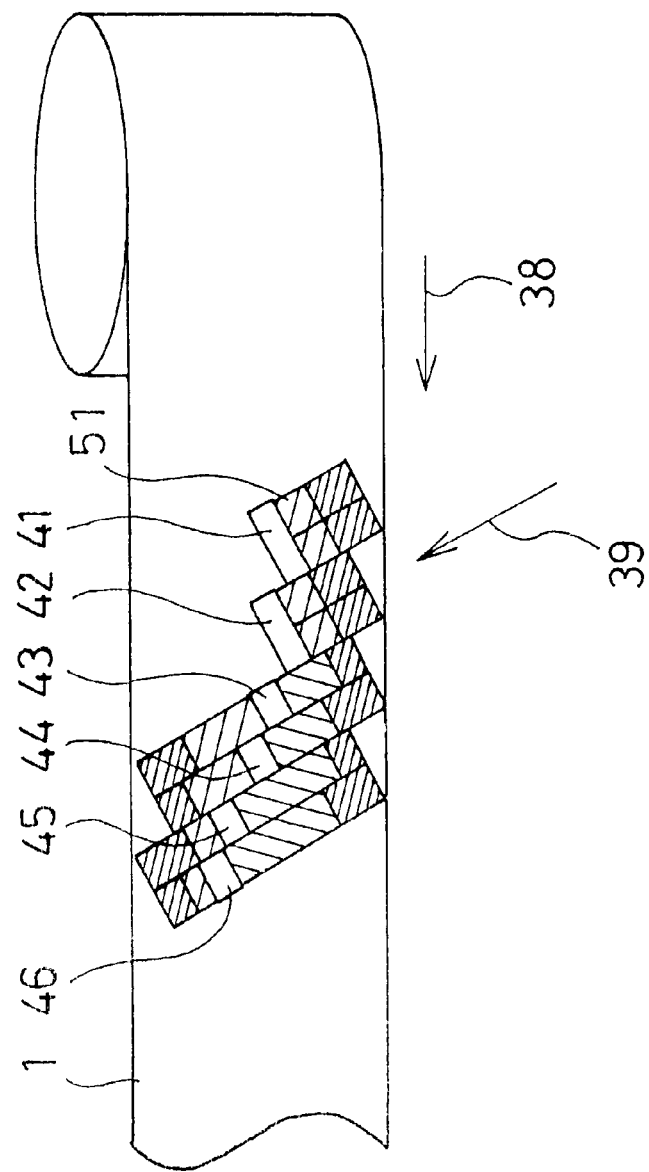
FIG. 5 is a diagram showing a recording pattern of the embodiment.

FIGS. 4 and 5 show (Embodiment 2). Referring to a recording format, the following will describe a specific example of a head installed on a cylinder and how (Embodiment 1) is carried out in this configuration.

As shown in FIG. 4, in a magnetic recording/reproducing apparatus of (Embodiment 2), a first erasing head 41, a second erasing head 42, and a first recording head 43, a second recording head 44, a third recording head 45, and a fourth recording head 46 are positioned on a cylinder. A clogging detection signal is recorded and an area of an information signal is erased on two tracks simultaneously.

FIG. 5 shows a recording pattern realized by the above head arrangement.

Although a conventional combination of erasing, recording, and reproducing heads requires twenty four heads, the present embodiment can achieve the same function with twelve heads because eight recording heads are positioned on a single cylinder. The first erasing head 41 and the second erasing head 42 have a track pitch, which is two tracks wide, for erasing, and the two combined heads record a clogging detection signal and erase a previously written signal in four tracks.

The first to fourth recording heads 43 to 46 each reproduce a clogging detection signal and record an information signal. The clogging detection signal is recorded by the erasing head having a zero azimuth angle. Thus, for example, in the case where reproduction is performed by the recording heads 43 and 45 having an azimuth angle of +20° and the recording heads 44 and 46 having an azimuth angle of −20°, a difference in azimuth angle is equal between the recorded clogging detection signal and the recording heads. Hence, each of the recording heads can provide a clogging detection signal at an equal level.

According to the above embodiments, a test signal is recorded in a specific section, which is at least one of the sections in the beginning and end of an area for recording an information signal of a recording track. However, the specific period is not limited to at least one of the sections in the beginning and the end of the area for recording the information signal of the recording track. For example, the information signal may be recorded in the beginning and end of the test signal at the center of the recording track to detect clogging of the head.

Next, the following Embodiments 3 to 7 will be discussed referring to a DV camera for home use and the recording and reproducing of a DVCPRO format, which has been developed for commercial use based on the above DV camera. The DV camera uses a tape having a width of ¼ inch, has a cylinder diameter of 21.7 mm, rotates at 9000 rpm, has a shortest recording wavelength of 0.5 μm, and has a recording/reproducing bit rate of 41.85 Mbps.

Embodiment 3

Figure 6:
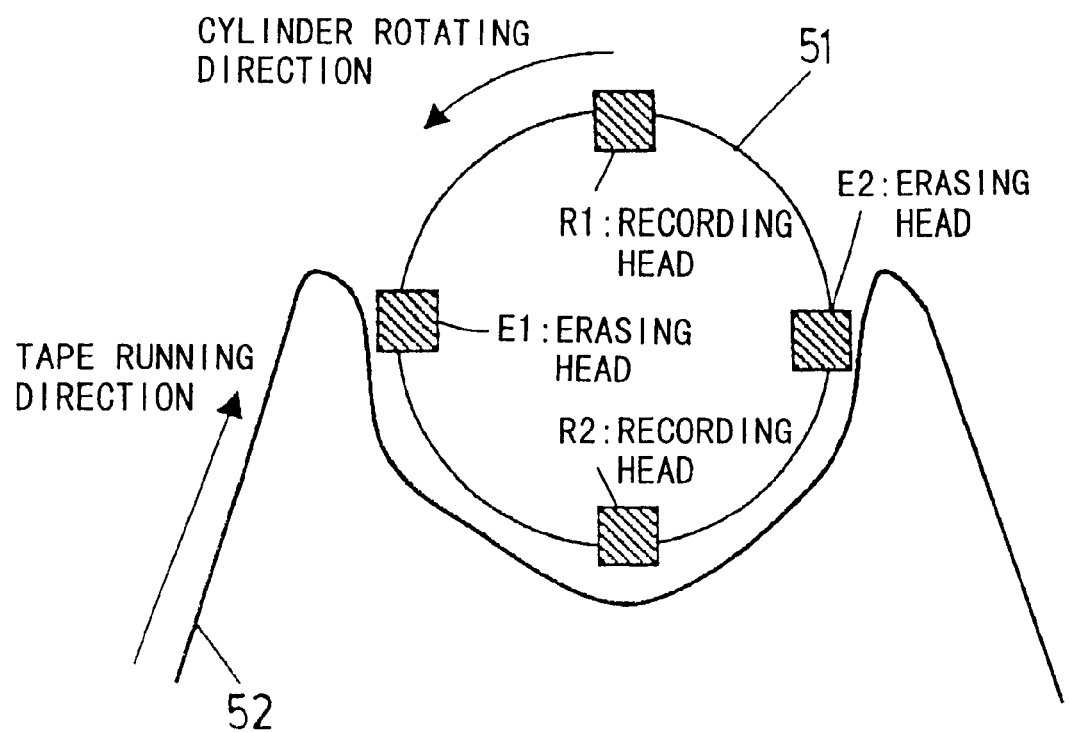
FIG. 6 shows a layout of heads of a rotary cylinder, which performs a recording verification method according to Embodiment 3 of the present invention.

As shown in FIG. 6, as Embodiment 3, recording heads R1 and R2 and erasing heads E1 and E2 are each positioned 90° apart on a rotary cylinder 51. The recording heads R1 and R2 and the erasing heads E1 and E2 are respectively opposed to each other at 180°. A magnetic tape 52 are wrapped around the cylinder 51 by 180° as shown by an arrow of FIG. 6.

Figure 7:
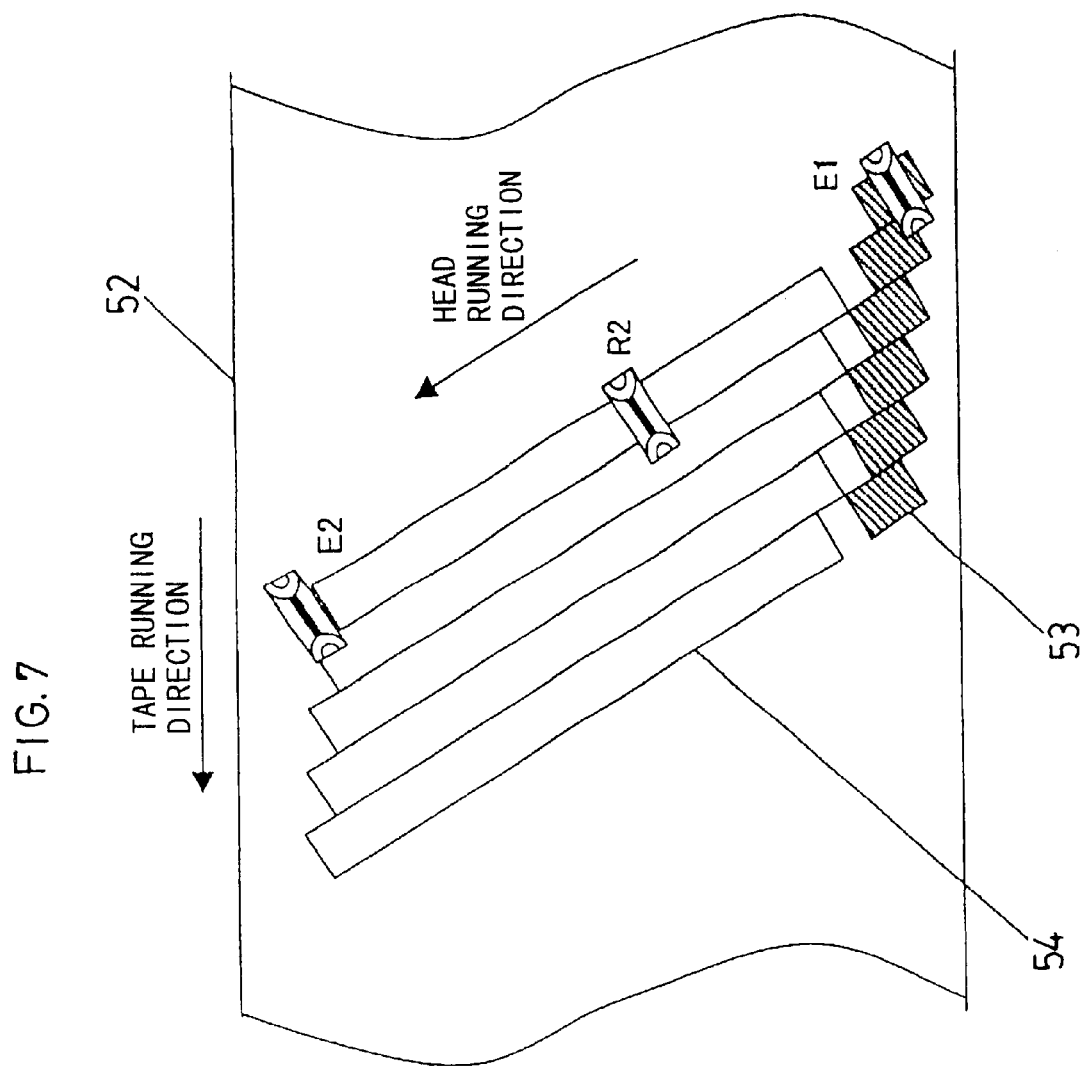
FIG. 7 is a conceptual rendering of a recording track pattern of the recording verification method.

The positions (relative height) of the heads are set to have a recorded tape pattern of FIG. 7. Namely, the position of the erasing head E2 is set to ensure that the erasing head E2 always scans a track prior to the recording head R2. At this moment, although FIG. 7 shows that the erasing head E2 and the recording head R2 simultaneously scan the same track, the arrangement is not particularly limited. The erasing head E2 may run ahead by several tracks as long as the recording head R2 runs on the same tracks later. In other words, on a single recording track, the erasing head E2 scans firstly and the recording head R2 scans later.

The erasing head E1 and the recording head R1 subsequently enter the tape and perform the same operation on another corresponding track.

Next, the following will discuss the operation of the heads upon recording.

In FIG. 7, the erasing head E2, which scans first, records sub information in a sub track 53, which serves as a second area on a predetermined position of a specific track. And then, the erasing head E2 performs AC erasing on a main track 54 serving as a first area. To be specific, a sub-information signal of repeated constant frequency (0.8 MHz) having a wavelength of 12.6 μm is recorded on the sub track 53, and excessive current at a constant frequency (33 MHz) of a wavelength of 0.3 μm applies to the erase head to AC erase the main track 54. Thus, the AC erasing is completed.

On the erasing head having a relatively large gap, upon erasing, recorded data can be erased by recording a short wavelength with excessive current. Upon recording, the erasing head is not suitable for recording data because recording demagnetization occurs when recording short wavelength signal. However, recording is possible in the case of a signal having a relatively long wavelength.

Next, the recording head R2, which scans the track which was previously scanned by the erasing head E2, first reproduces sub information recorded in the sub track 53 and records main information in the main track 54.

From a signal of the sub track 53 that is reproduced by the recording head R2, only a single wavelength component of sub information is extracted by a band path filter having a pass band width of 200 kHz. A detector makes a determination of a detection output level of a reproduced envelope. When a reproduced output level is verified, the state is normal. When the output is at a preset value or below, it is determined that an abnormal condition occurs on the recording head R2, and a first detection signal is produced to judge reliability of recording based on the reproducing capability of the recording head.

When recording is performed by a VTR, in the case where adherents and the like are found on a surface of the head, the recording head and the tape are separated from each other. Thus, the tape cannot be magnetized effectively. However, according to the present invention, since the recording head reproduces sub information, it is possible to detect a spacing loss resulting from adherents.

In order to verify the recording operation by the recording head R2, current applied to the recording head is measured, the current waveform is rectified, and a second detection signal is produced for determining based on an envelope level thereof whether the recording current is appropriate or not relative to a preset value.

When abnormality is detected even on one of the first and second detection signals, the VTR determines that an abnormal condition occurs in a recording process and issues a warning to the user of the VTR.

Regarding sub information recorded by the erasing head, a high-density recording VTR generally uses an azimuth recording method, by which recording is performed while adjacent tracks have different recording azimuth angles. In the present embodiment as well, erasing is carried out while the recording heads have azimuth angles of +20° and −20° and the erasing head has an azimuth angle of 0°. In the present embodiment, the recording head R1 is +20° in azimuth angle and the recording head R2 is −20° in azimuth angle (not shown).

As described above, the erasing head and the recording head are different from each other in azimuth. Thus, as sub-information output reproduced by the recording head, the output reduced by an azimuth loss is reproduced. Hence, as sub information, it is preferable to record a single frequency, which is less likely to have azimuth loss and has a relatively long wavelength.

When there is a difference in azimuth between the recording pattern and the reproducing head, azimuth loss occurs on a reproduction output. The loss is indicated by the following equation, where W represents a track pitch and θ represents a difference in azimuth angle. Here, the foregoing FIG. 3 is an example of a graph showing azimuth loss.

$$\text{Azimuth loss } (db) = 20 \times \log|\sin(\pi \cdot W \cdot \tan \theta/\lambda)/(\pi \cdot W \cdot \tan \theta/\lambda)|$$

This equation indicates that the reproduction output becomes extremely small as a wavelength λ increases by an integral multiple of W·tan θ, and a loss increases inversely with a wavelength. For this reason, as sub information, it is understood that recording a long wavelength is effective to increase a reproducing sensitivity. The longer wavelength is smaller in azimuth loss.

However, a reproduced output of a head is a differentiated function of the magnetic flux from the tape. Hence, a lower output is obtained at lower frequencies as the output is increased proportionately with a frequency (proportionate to a reciprocal of a wavelength). Consequently, only a low output can be obtained at an extremely low frequency as an absolute output.

Therefore, a specific wavelength signal is recorded which is twice the size of the first extremely small value wavelength indicated by the equation of azimuth loss. To be specific, in the case of a DVCPRO format having a track pitch of 18 μm and a relative speed of 10.2 m/s, a difference in azimuth angle is 20°. Hence, a frequency of 0.778 MHz corresponding to a wavelength of 13.1 μm is recorded as sub information. The wavelength is twice a wavelength of 6.55 μm, which is the first extremely small point.

As a signal source for sub information, detecting sensitivity is almost equal both in the case of using a quartz oscillator of 0.778 MHz and in the case where a clock frequency having a recording data rate of 41.85 Mbps is divided by 53 and a frequency of 0.790 MHz is recorded.

In the above experiment, upon recording and reproducing, an output is substantially constant within a permissible range when a wavelength is at about ±10% of 13.1 μm, a calculated value. The output tends to decrease at a wavelength other than the above.

Figure 8:
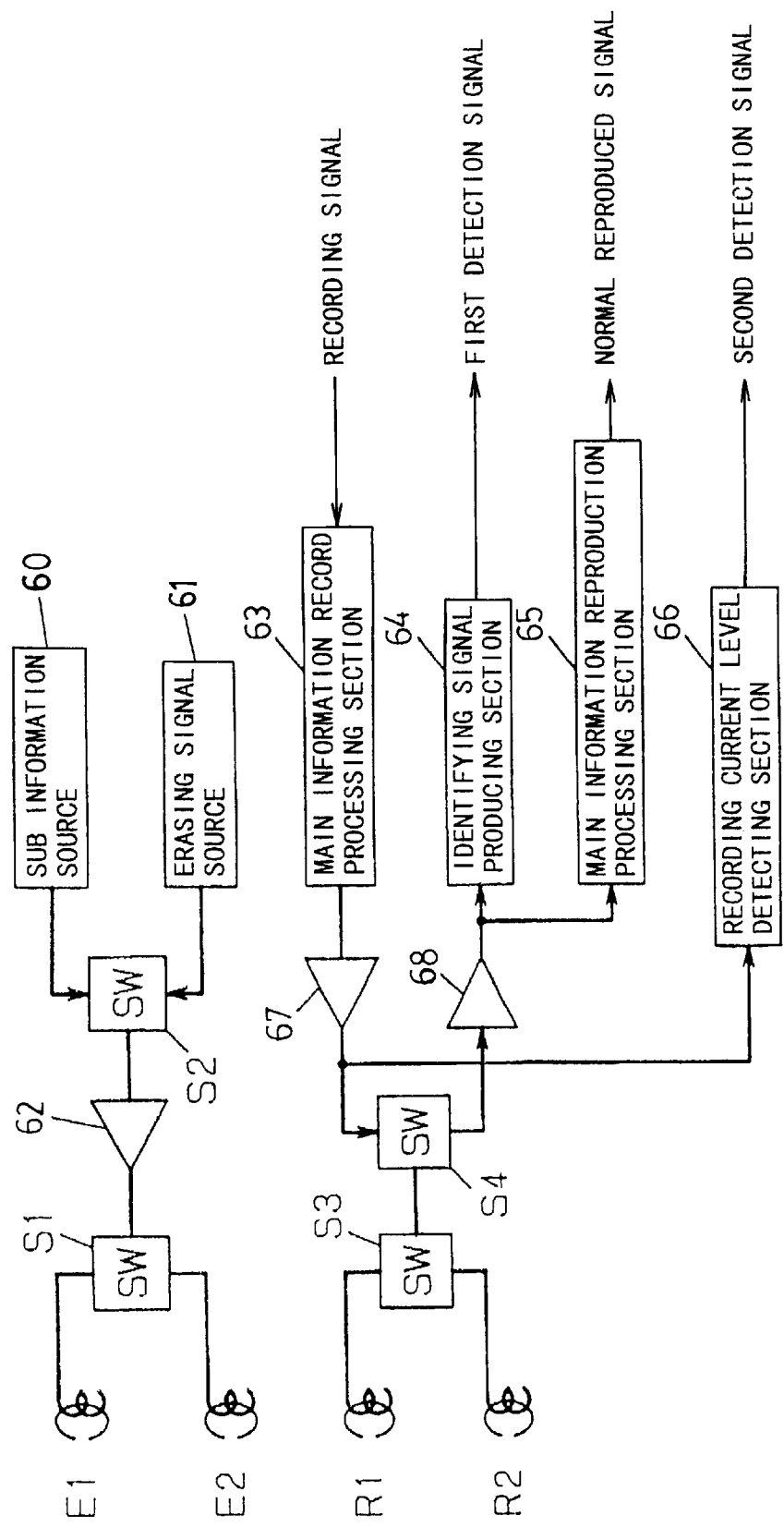
FIG. 8 is a block diagram showing the configuration of a circuit for performing the above recording verification method.
Figure 9:
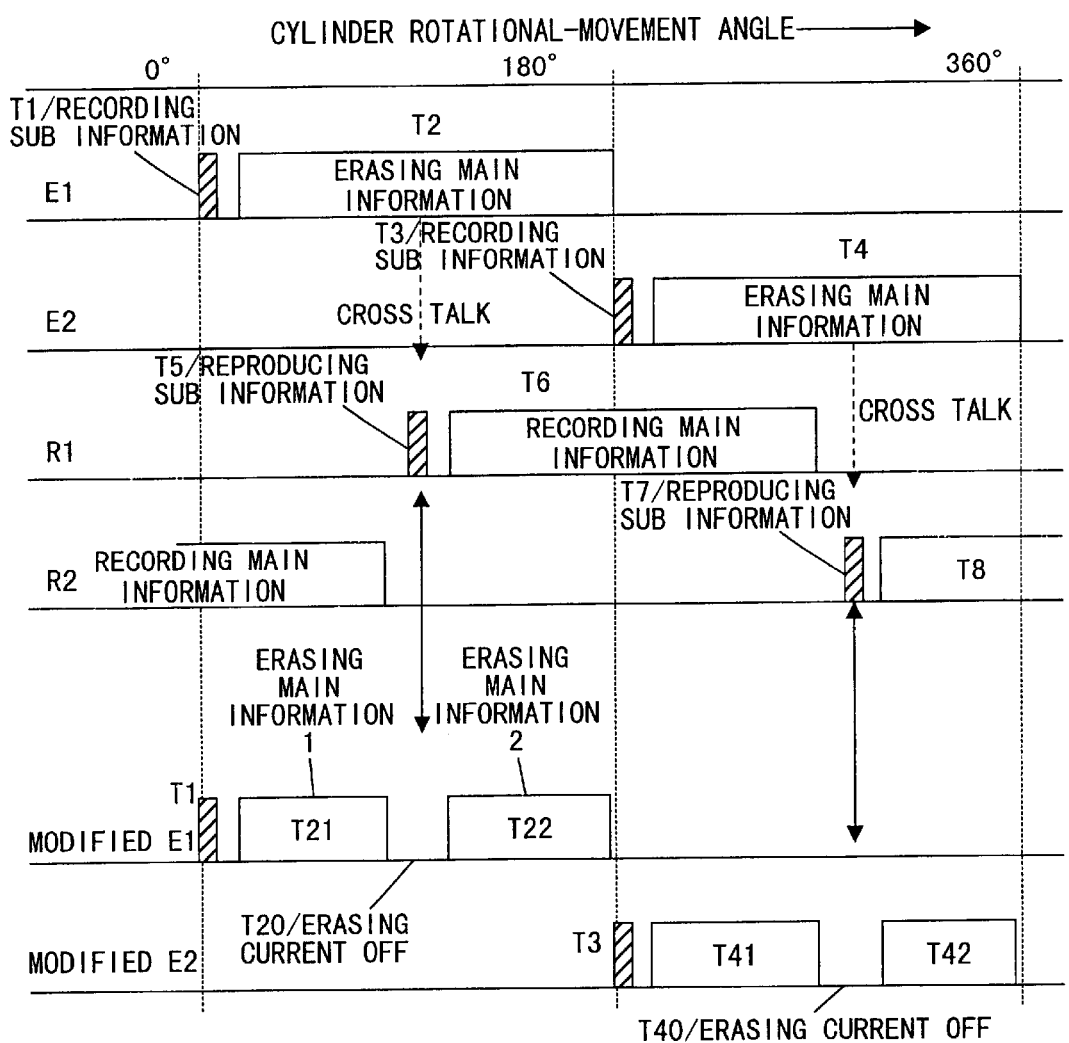
FIG. 9 is a timing chart showing the operation of the recording verification method.

The following will discuss a signal processing of recording and reproducing systems of the present embodiment. FIG. 8 is a block diagram showing the configuration of a signal circuit of the present embodiment. FIG. 9 is a timing chart showing the operational timing relative to a rotational-movement angle of the cylinder.

As shown in FIG. 8, in a recording/reproducing apparatus of the present invention, erasing heads E1 and E2 have two kinds of signal sources of a sub information source 60 for producing sub information and an erasing signal source 61 for producing an erasing signal. The signal sources are switched by a switch S2, are amplified by an erasing head amplifier 62, and are supplied to the erasing heads E1 and E2. The selection of a head making contact with a tape derives a head switching signal separately by a VTR control section (not shown), and a head making contact with the tape is selected by a switch S1.

To improve accuracy, the sub information source 60 uses a quartz oscillator, or a recording data clock is divided and high frequency (recording wavelength) accuracy is used.

According to a running position of a tape pattern, a recording mode and a reproducing mode of the recording heads R1 and R2 are switched by a switch S4. The connection is made to a reproducing amplifier 68 when the sub track 53 is scanned. An identifying signal producing section 64 makes comparison with a reproducing level of sub information and produces a first detection signal for verifying an operation. Furthermore, the connection is made to a recording amplifier 67 when the main track 54 is scanned. Main information, in which a recording signal is processed by a main information record processing section 63, is converted to recording current and is applied to the recording head. At this moment, as for the recording current, the output of the recording amplifier 67 is monitored in a recording current level detecting section 66, and a second detection signal is produced according to a detecting level of an envelop. The selection of a head making contact with a tape derives a head switching signal separately by the VTR control section, and a head in contact with the tape is selected by a switch S3.

The recording operation is verified by the first and second detection signals. Additionally, a reproduction signal from a reproducing amplifier 68 is normally outputted as a reproduction signal by a main information reproduction processing section 65.

The above description discussed the basic configuration of the present invention. The detailed configuration will be described in the following embodiments.

Embodiment 4

When sub information is reproduced by a recording head and a first detection signal for identifying an operation is produced, the entry of a signal other than sub information may cause a problem in producing an identifying signal.

As shown in FIG. 9, a recording head, an erasing head, and the rotation of a cylinder have a fixed relationship of operational timings. When sub information is recorded on the entry side of a recording track, the erasing heads E1 and E2 and the recording heads R1 and R2 are shifted in timings by 90° according to their positions. Relative to a rotational-movement angle of the erasing head E1, the E1 head records sub information in a period T1 from a rotational-movement angle of 0°, and the head E1 applies an erasing signal in a period T2. The R1 head, which follows 90° behind the E1 head, reproduces only in a period T5 after rotating 90°. And then, a period T6 is used for the recording process of main information.

An interfering magnetic field (cross talk) occurs from the erasing head E1 to the recording head R1 while erasing current is applied in the period T2 of the erasing head E1 in a sub information reproducing period T5 of the recording head R1. In order to avoid the interference, as shown in modified E1, the erasing period T2 is divided into three, and erasing current is interrupted temporarily for a period T20. In a period other then the period T20, conventional erasing current is applied. It is therefore possible to reduce cross talk on the recording head R1.

Namely, when sub information is recorded by the recording head, the adjacent erasing head is in an erasing process. Identification is expected to be difficult because noise enters in a reproducing operation of the recording head due to the influence of an electromagnetic field, which directly leaks to the recording head from current applied to the erasing head. Therefore, as a solution, it is effective to interrupt current applied to the erasing head. Moreover, even if the current is not interrupted, current may be reduced such that cross talk is at a permissible value or below.

Embodiment 5

The following will describe Embodiment 5 of the present invention. In the present embodiment, different signals (different wavelength components) of sub information are recorded according to tracks. Such a configuration is effective as a means for identifying a defective head when sub information is reproduced by the recording head. Such a configuration is effective when clogging is not simultaneously detected on all the recording heads but are sequentially switched and examined.

For instance, when a recording system has more than one channels, the following method is available: only a single reproducing system of an operation identifying circuit is provided, the recording heads is switched by time division and are connected to the operation identifying circuit, and verification is made. Thus, the circuit can be remarkably reduced in size. Additionally, a defective head can be identified by a reproducing wavelength component.

Embodiment 6

The following will describe Embodiment 6 of the present invention. In the present embodiment, recording channels are provided in two systems to double a recording rate.

Figure 10:
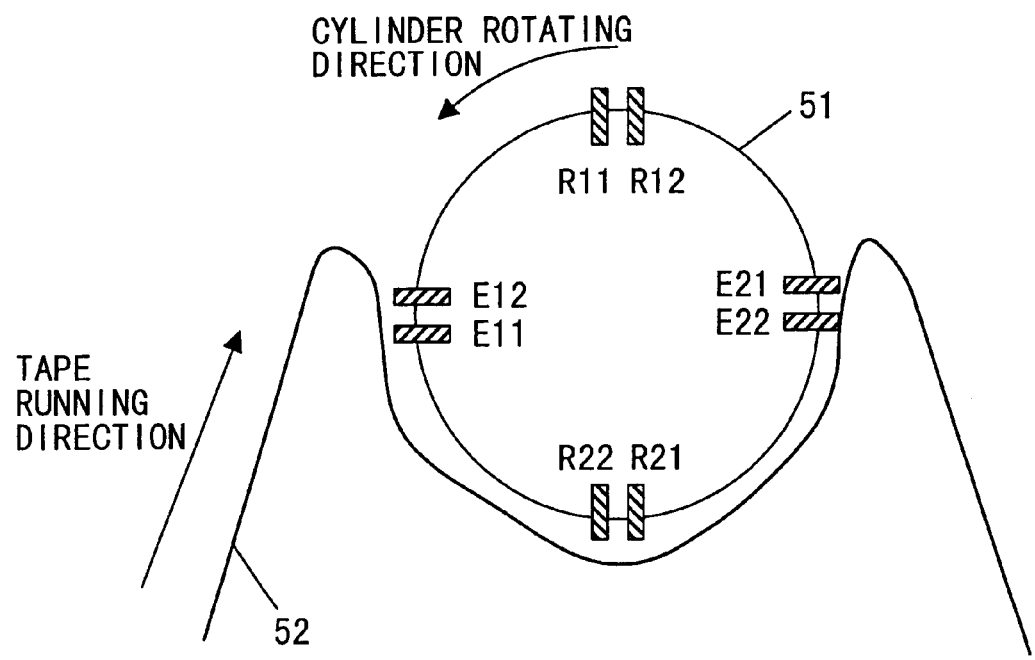
FIG. 10 shows a layout of heads of a rotary cylinder, which performs a recording verification method according to Embodiment 4 of the present invention.

As shown in FIG. 10, when recording heads and erasing heads are respectively arranged in pairs, in a process of reproduction using the recording head, accuracy of detecting is deteriorated on reproduced sub information due to the entry of a main information signal, which is recorded by the adjacent recording head.

Figure 11:
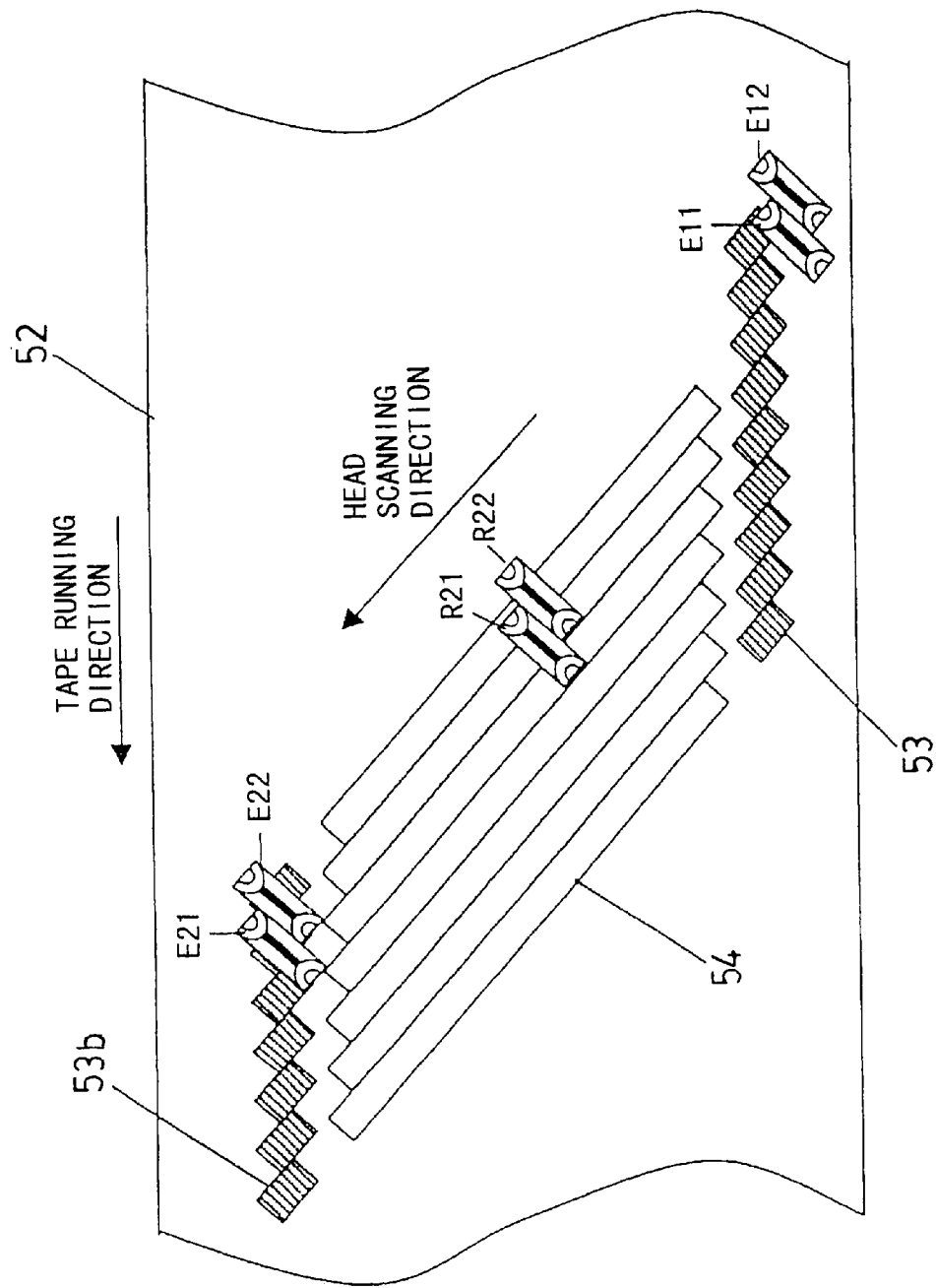
FIG. 11 is a conceptual rendering showing a recording track pattern of the recording verification method.

Such inconvenience results from an extremely large difference between a recording magnetic field and a reproducing magnetic field and a rotary transformer used for a rotary cylinder. This problem is unavoidable. Meanwhile, as shown in FIG. 11, the present embodiment records sub information on the front and the back of a main track 54 (sub tracks 53 and 53b).

Since sub information is recorded in the sub tracks 53 and 53b on the front and the back of the main track 54, on the entry side of the head, when a preceding recording head R11 reproduces sub information, a subsequent head R12 is not on a recording mode position. On the exit side of the head, when a subsequent head R22 reproduces sub information 53b, a preceding head R21 is not on a recording mode position.

Figure 12:
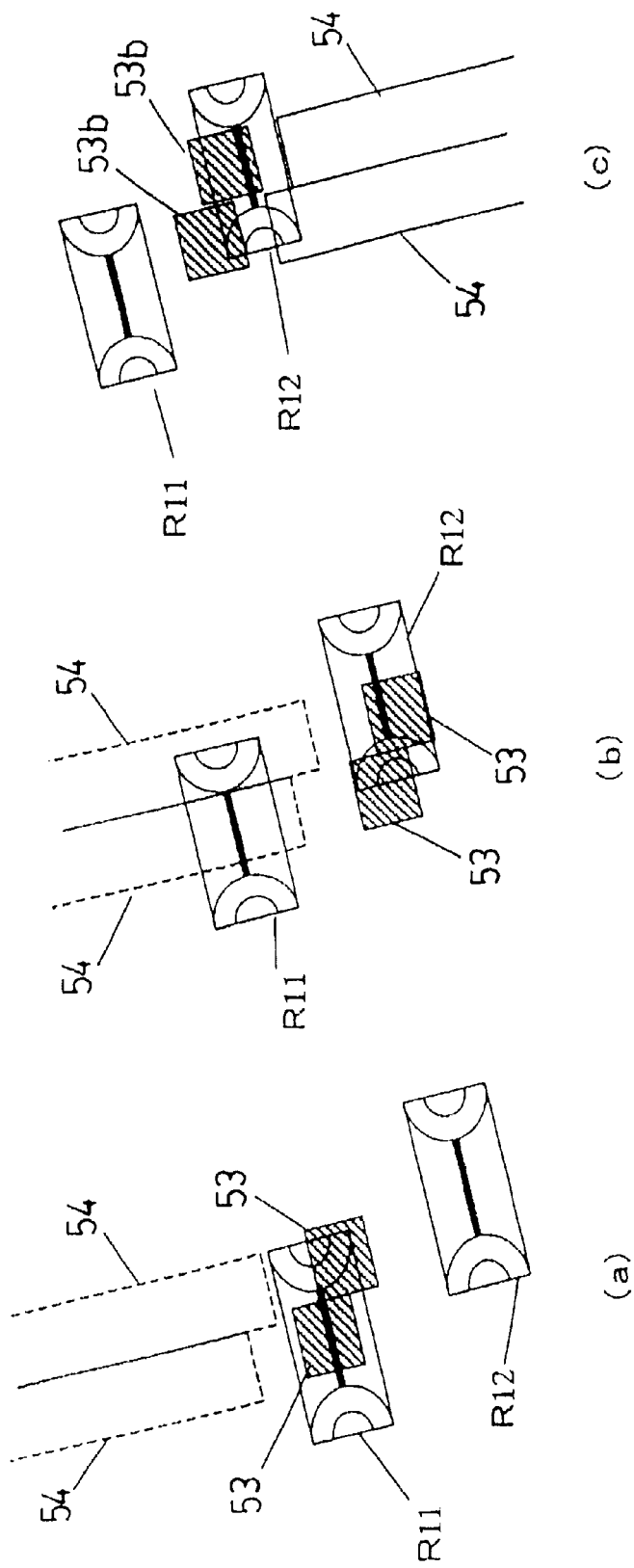
FIG. 12 is a conceptual rendering of operations of heads when two adjacent heads carry out recording according to the record-verification method.

FIG. 12 shows the above operation. In the case of FIG. 12($a$), leakage of a signal between the paired heads does not cause cross talk or result in a problem due to a difference in timing. Meanwhile, in the case of FIG. 12($b$), the recording head R11 is in a recording mode and the recording head R12 is in a reproducing mode. It is not possible to prevent the cross talk from the recording head R11 to the recording head R12.

With the above configuration, regarding a first detection signal produced by reproducing sub information, the production is made when the front sub information entering a main information part is reproduced in the preceding head (FIG. 12($a$)). The subsequent head produces a detection signal by reproducing a sub information part after passing through the main information part (FIG. 12($c$)). Consequently, the first detection signal is obtained with reliability.

Furthermore, in a reverse pattern, regarding a second detection signal generated by monitoring recording current, the preceding head reproduces a recording leakage signal of the subsequent head after passing through the main information part (FIG. 12($c$)). The subsequent head reproduces a leakage signal of the preceding head before entering the main information part (FIG. 12($a$)). Thus, the second detection signal is obtained.

As a method of using cross talk in a positive manner, even if sub information is reproduced at one time, since cross talk is several times larger with respect to a detecting level, a current value of the paired heads can be detected as cross talk by increasing a threshold value of detection.

The above methods are effective means for avoiding cross talk when using paired heads of two systems. The effect is achieved by recording sub information on the front and the back of main information.

Additionally, even if the head is constituted by a plurality of channels, the recording is verified by time division for each of the heads. Hence, it is possible to verify the recording of all the heads.

Embodiment 7

Figure 13:
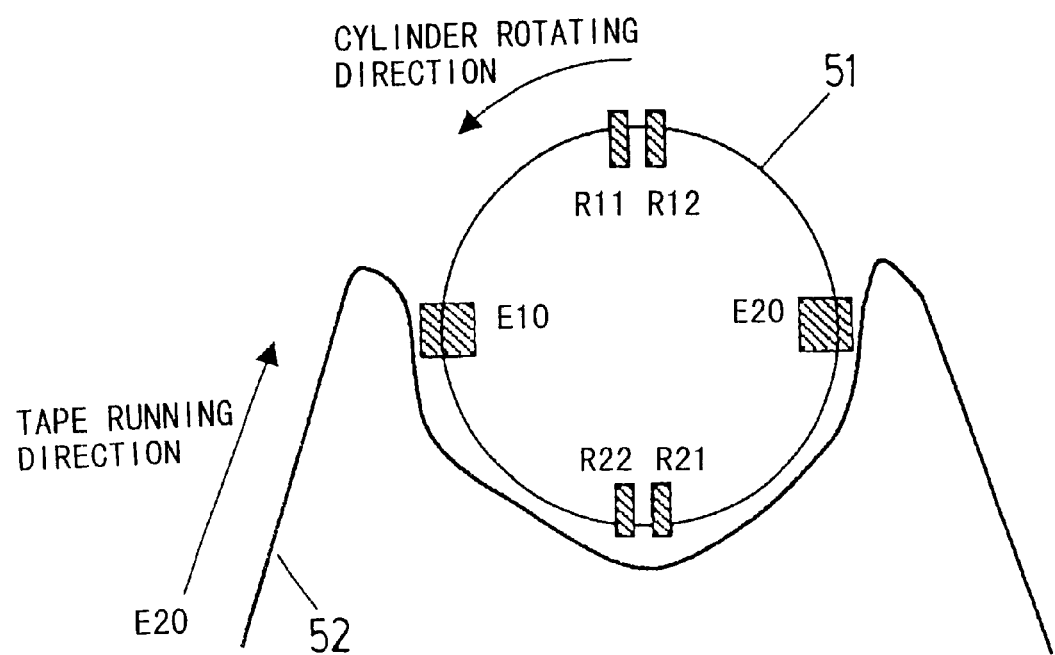
FIG. 13 is a layout showing a head of a rotary cylinder, which performs a recording verification method according to Embodiment 5 of the present invention.
Figure 14:
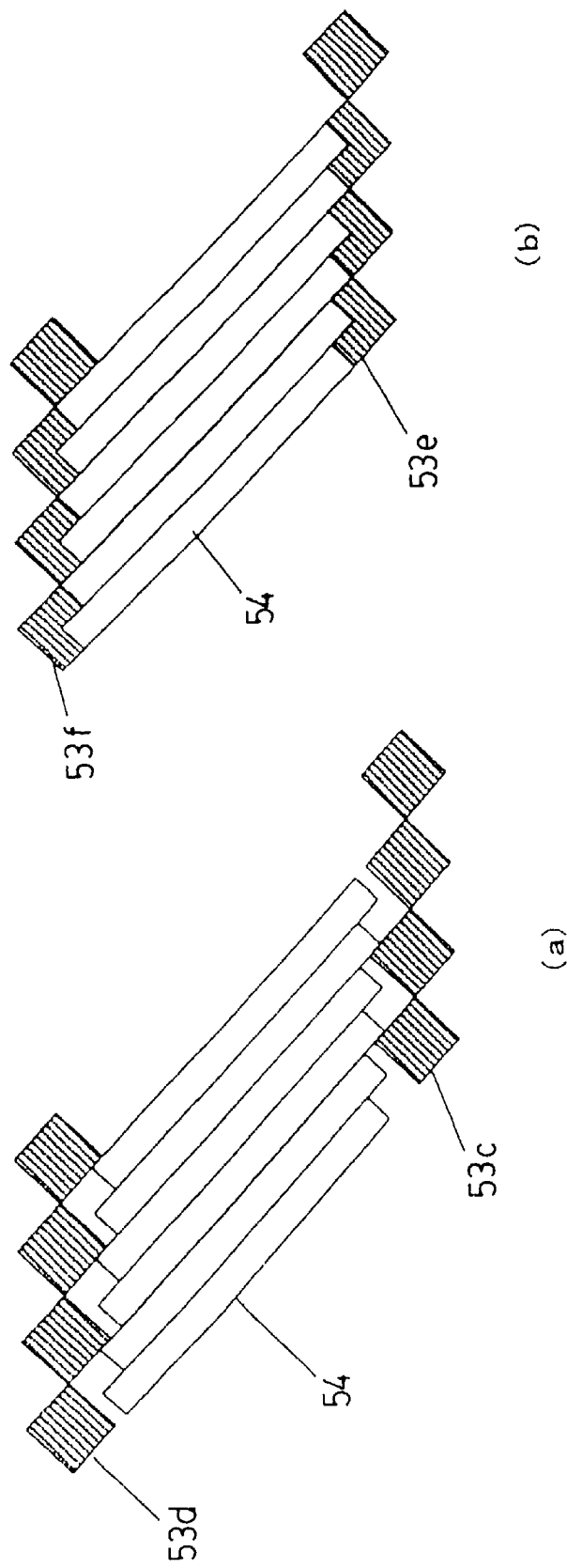
FIG. 14 is a conceptual rendering of a track pattern when the two tracks are erased at once by the recording verification method.

The following will describe Embodiment 7 of the present invention. In contrast to the configuration of the head shown in FIG. 10, erasing heads are reduced in number in the present embodiment. FIG. 13 is a diagram showing the configuration of the heads and a method for erasing two tracks by a single head (erasing head E10 or E20), according to the present embodiment. FIG. 14 shows a recording pattern of the present embodiment. As shown in FIG. 14, a width of a sub track is twice that of a main track.

In FIG. 14(a), sub tracks 53c and 53d for recording sub information carry out recording a little away from a main track 54 for recording main information. As shown in FIG. 14(b), recording is possible while the sub tracks 53e and 53f are close to or overlap the main track 54.

At this time, in FIG. 14(b), since the sub tracks 53e and 53f record sub information before main information is recorded, the recording positions of sub information do not have to be exactly on the front and the back of the main information. Recording is possible while the sub tracks are substantially close to or overlap the main information recording section. Sub information is a single signal having a relatively long wavelength, and even when main information is written thereon, only slight influence occurs over a recording/reproducing characteristic of the main information.

As a mechanism of a VTR, the larger an angle for wrapping a tape around a cylinder, running tension increases on the tape, resulting in damage on the tape. Hence, it is preferable to minimize a recording part of sub information. Therefore, FIG. 14(b) is more desirable than FIG. 14(a).

As described above, as a method for verifying the reliability of a recording process, sub information is recorded in a first head (erasing head) and is reproduced in a second head (recording head). It is possible to detect the presence or absence of adherents on a surface of the recording head based on a level of reproduction output, and recording current of the second head is monitored, thereby verifying the recording process with reliability.

With a camcorder for acquisition constituted by a VTR which is a recording/reproducing apparatus with the above function and a camera combined therewith, it is possible to sequentially detect problems in the VTR during acquisition using the camera. Thus, it is possible to provide a camcorder with high reliability that can prevent a recording failure resulting from clogging of a head, a malfunction of an electrical system, or the like. A VTR using the above method of verifying clogging of heads is a final embodiment for commercial production of the present invention.

Generally, a minimum area for verifying an operation can be sufficiently used as an area for recording sub information. Thus, it is not necessary to provide a relatively large area shown in the figures. In the present embodiment, the main track for recording main information is equivalent to 174° around the cylinder. The sub track for recording sub information is detectable when it covers about 1° on the cylinder. In the case where sub information is recorded in the beginning and the end of the main information as well, the accuracy of detection is sufficient when the beginning and the end each covers an area of 1°.

In a VTR, there is a limit of reducing a recording range of sub information because of its mechanical components and assembling accuracy. Moreover, when erasing current is interrupted while reproducing sub information, if its ratio is 3% or more, a tracking signal included in main information is lost, resulting in a problem on tracking accuracy.

Generally, a tracking signal is recorded as a component having a long wavelength. Several points on the entire track length are subjected to sampling so as to produce a tracking error signal. Therefore, if erasing current is interrupted for a long time, a tracking signal recorded before is left when a recorded tape is overwritten, resulting in an error signal in the rewritten track.

For this reason, it is preferable that a sub information part is large enough to obtain a detection signal in a stable manner. For practical use, its ratio needs to be 3% or below of main information.

Recording current can be monitored by a means for directly monitoring current of a recording circuit, and monitored by detecting cross talk of main information recorded when reproducing sub information.

Figure 15:
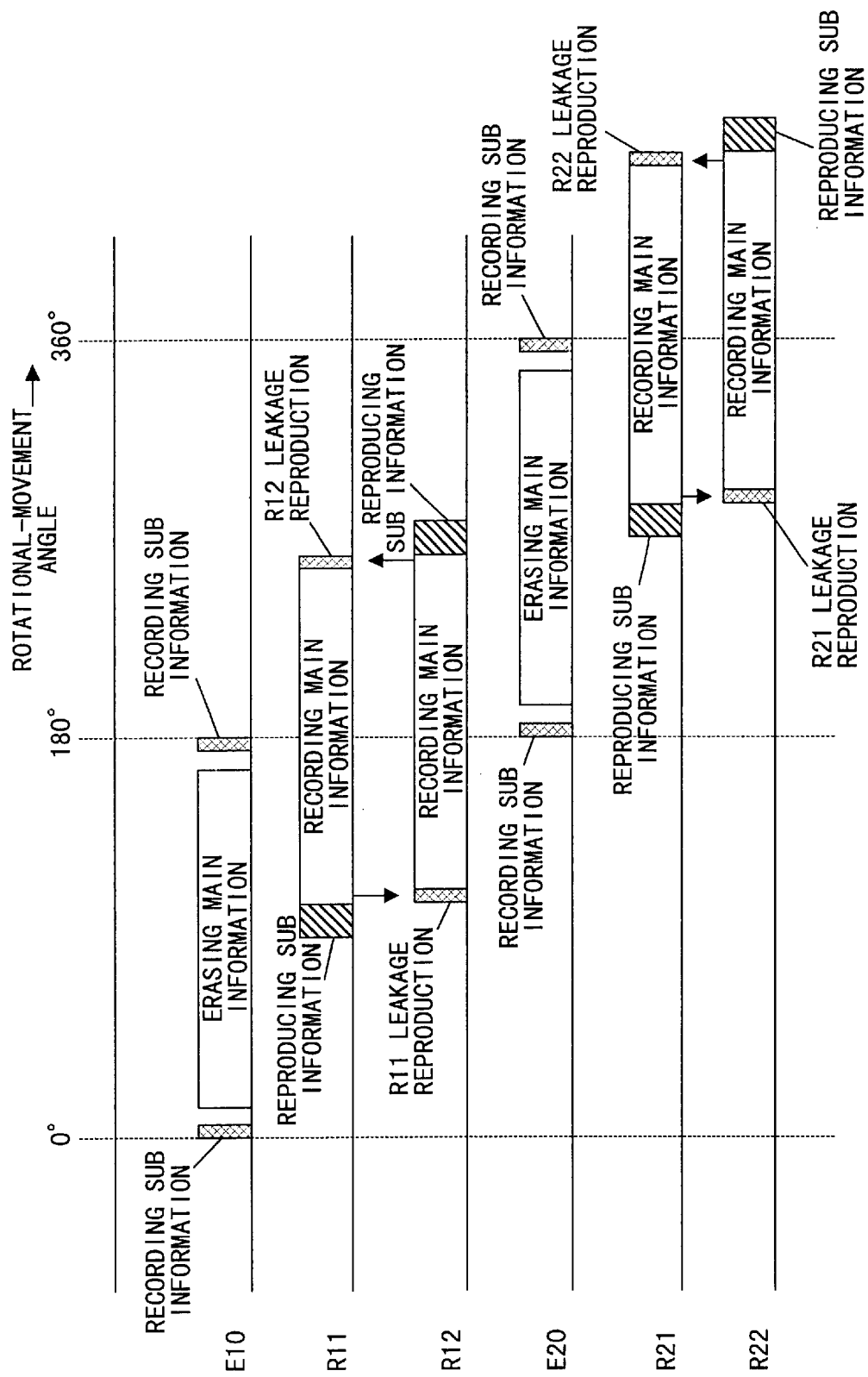
FIG. 15 is a timing chart showing the operation of the recording verification method.

For instance, in the case of the configuration of the head (FIG. 13) described in the present embodiment, the timings of applying currents to the recording head and the erasing head are indicated in FIG. 15. It is possible to utilize a difference in timing between the recording process and the reproducing process. The difference appears in accordance with a position of the head.

As shown in FIGS. 10 and 11, generally in the case of two heads positioned close to each other, that is, combined heads, when one head is in a recording state and the other is in a reproducing state, if recording current is applied to one head, a recording magnetic field leaks to the other head with a magnitude several times larger than a magnetic field reproduced from a normal tape. And an output several times larger than a reproduction output is reproduced. By using this characteristic, in FIG. 15, while the preceding recording head R11 enters a recording mode and the subsequent recording head R12 is in a reproducing mode (R11 leakage reproduction period in FIG. 15), the output of the recording head R12 is differentiated based on being above a threshold value of a sub information reproducing level. Thus, it is possible to verify that recording current passes through the preceding recording head R11.

Also, in case of verifying recording current of the subsequent recording head R12, in a period when the preceding recording head R11 enters a reproducing process after completing a recording process while the subsequent recording head R12 is in a recording process (R12 leakage reproduction period in FIG. 15), the output reproduced by the recording head R11 is discriminated based on a threshold value of a normal sub information reproducing level or above. Hence, it is possible to verify that recording current passes through the subsequent recording head R12.

The same holds true for the opposing recording heads R21 and R22.

Figure 16:
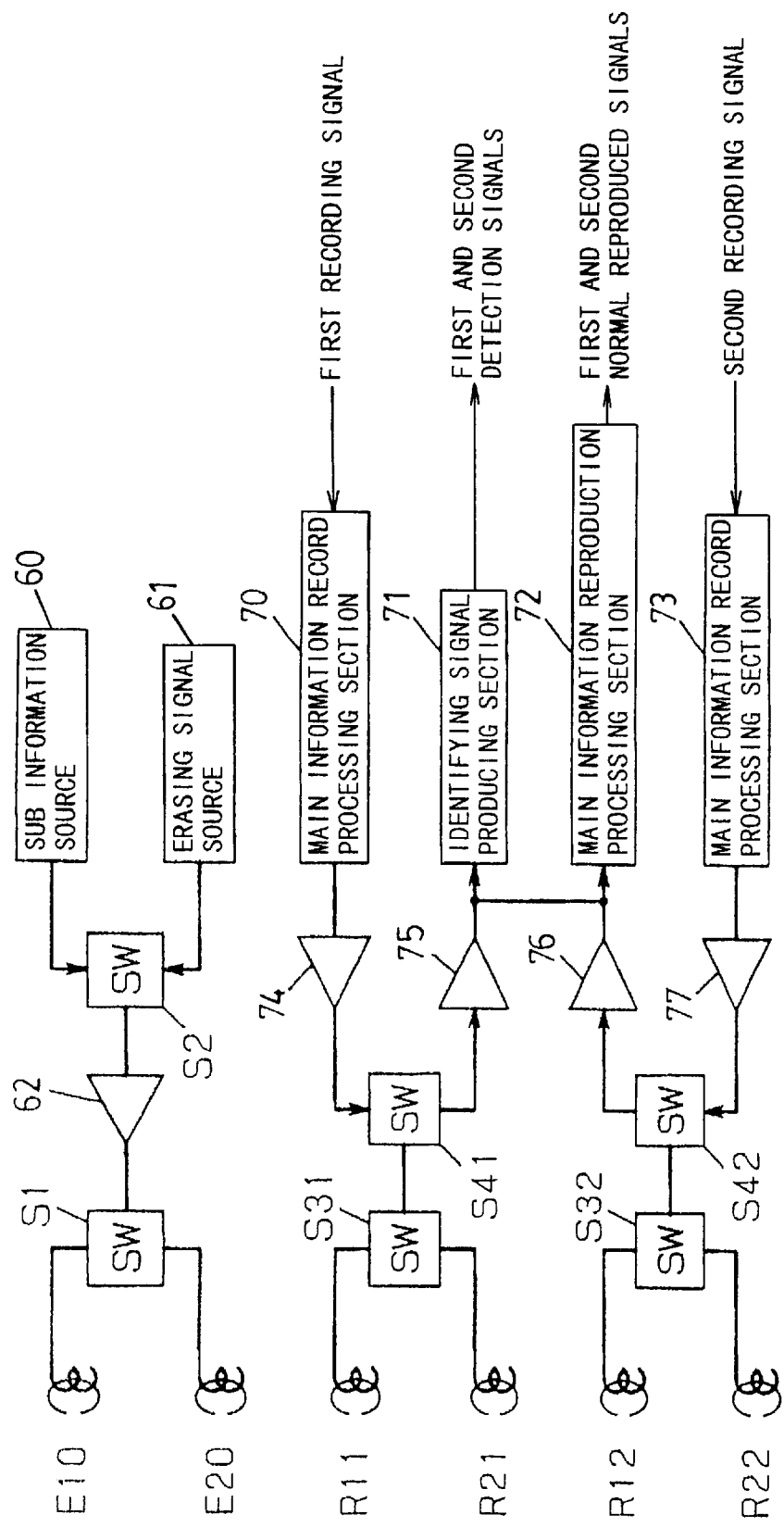
FIG. 16 is a block diagram showing the configuration of the recording/reproducing apparatus.
Figure 17:
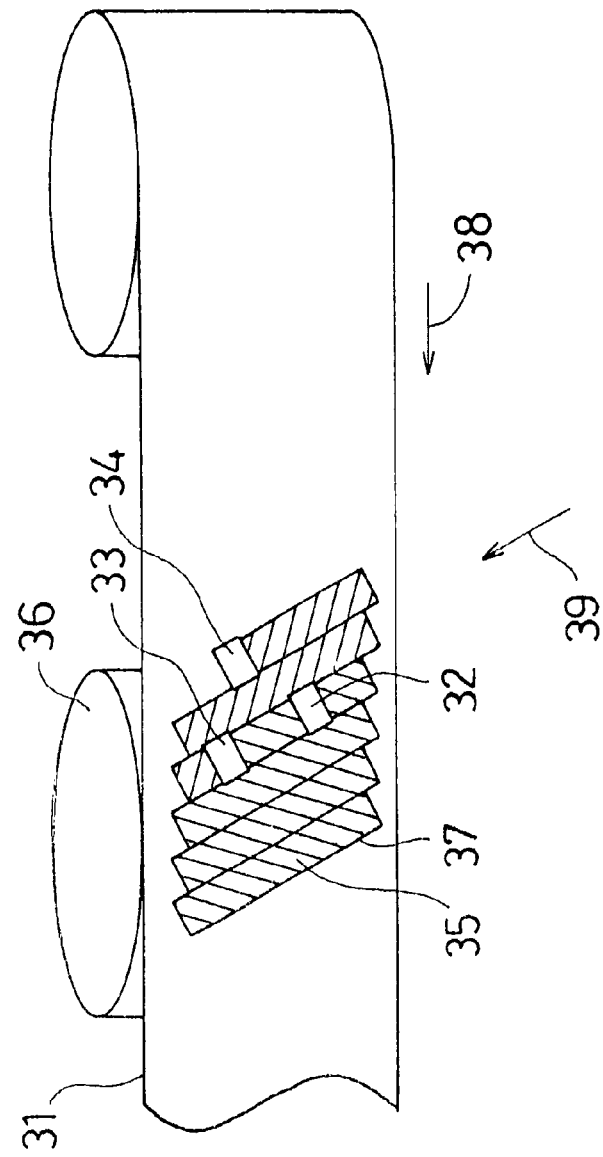
FIG. 17 is an explanatory drawing showing a clogging detection method for a head of a conventional VTR.

FIG. 16 is a block diagram showing the configuration of the recording/reproducing apparatus of the present embodiment. In FIG. 16, erasing heads E10 and E20 have two kinds of signal sources including a sub information source 60 for producing sub information and an erasing signal source 61 for producing an erasing signal. The source switched by a switch S2 is amplified by an erasing head amplifier 62 and is supplied to the erasing heads E10 and E20. Upon selecting a head making contact with the tape, a head switching signal is separately guided by a VTR control section (not shown), and a head making contact with the tape is selected by a switch S1.

As for the sub information source 60, in order to improve the accuracy, a quartz oscillator is used and a recording data clock is divided so as to use a source having a high accuracy of frequency (recording wavelength).

The recording heads R11 and R21 and R12 and R22 are switched by switches S41 and S42 between a recording mode and a reproducing mode according to a running position of a tape pattern. When the sub track 53 is scanned, connection is made to reproducing amplifiers 75 and 76, and an identifying signal producing section 71 compares a reproducing level of sub information and produces a first detection signal for verifying an operation. Further, in the case of a main track 54, connection is made to recording amplifiers 74 and 77, and main information of each channel is converted into recording current and is applied to the recording heads. The main information is produced by processing first and second recording signals in main information record processing sections 70 and 73. At this moment, like timings shown in FIG. 15, a leakage magnetic flux is reproduced by the recording head R12 when the recording head R11 records, by the recording head R11 when the recording head R12 records, by the recording head R22 when the recording head R21 records, and by the recording head R21 when the recording head R22 records. In the identifying signal producing section 71, differentiation is made based on a predetermined threshold value and the magnetic flux is outputted as a second detection signal.

Additionally, upon selection of a head making contact with the tape, a head switching signal is guided by a VTR control section (not shown), and a head making contact with the tape is selected by switches S31 and S32. Moreover, reproduction signals from reproducing amplifiers 75 and 76 are outputted as first and second normal reproduction signals, which correspond to channels, by a main signal reproducing section 72.

As described above, according to the configuration of FIG. 16, a first detection signal for verifying reproduction and a second detection signal for verifying recording current can be produced by the identifying signal producing section 71.

Moreover, although a single recording wavelength is substituted for sub information in the present embodiment, it is certainly possible to record normal data. Furthermore, when the first head and the second head are equal in azimuth, detection can be performed more easily. If a reduction in erasing capability is accepted, this embodiment can be put into practical use.

What is claimed is:

1. A recording head clogging detection method for detecting clogging of the recording head in a magnetic recording/reproducing apparatus which carries out reproduction from a magnetic tape having an information signal recorded thereon by rotating and scanning a head in sequence, said signal being provided helically with respect to a longitudinal direction of said magnetic tape, the method comprising:

recording a test signal on the magnetic tape by applying current with a frequency lower than an erasing frequency to an erasing head which erases an area on a magnetic tape for recording an information signal before said recording head records information in a recording track, for each recording track, every specified number of recording tracks or every specified time, at a timing when said erasing head traces a specific section of the area for recording an information signal in said recording track; and determining the presence or absence of clogging of said recording head by evaluating the reproduced test signal obtained by reproducing said test signal, which is recorded by said erasing head, by means of said recording head wherein when a track pitch is W ($\mu$m) and a difference in azimuth angle is $\theta$(radian) between said erasing head and said recording head, a wavelength $\lambda$($\mu$m) of said test signal is set longer than $\lambda = \pi W \theta/6$.

2. The recording head clogging detection method according to claim 1, wherein said specific section for recording said test signal is at least one of sections in the beginning and the end of said area for recording an information signal in said recording track.

3. A recording head clogging detector in a magnetic recording/reproducing apparatus which reproduces from a magnetic tape having an information signal recorded thereon by rotating and scanning a head in sequence, said signal being provided helically with respect to a longitudinal direction of said magnetic tape, said recording head clogging detector comprising:

signal selecting means for selecting an erasing signal and a test signal that is lower in frequency than a frequency of said erasing signal, and applying said signals to said erasing head for erasing an area on a magnetic tape for receiving an information signal recorded by said recording head;

control means for instructing said signal selecting means to apply said test signal to said erasing head for each recording track, every specified number of recording tracks or every specified time, at a timing when said erasing head traces at least one of sections in the beginning and the end of said on a magnetic tape for receiving an information signal recorded by said recording head; and evaluating means for determining presence or absence of clogging of said recording head by evaluating the reproduced test signal obtained by reproducing said test signal, which is recorded by said erasing head, by means of said recording head wherein, when a track pitch is 18 $\mu$m and a difference in azimuth angle is 20° between said erasing head and said recording head, a wavelength of said test signal is long than 3 $\mu$m.

4. A recording verification method for determining reliability of a recording operation in a recording/ reproducing apparatus in which heads mounted on a rotary cylinder scan a tape in a helical direction, a track is formed on said tape, and information is recorded and reproduced, said heads comprising a first head and a second head, said track comprising a first area and a second area, the method comprising:

erasing by said first head said first area and recording sub information in said second area, and recording by said second head main information in said first area and reproducing sub information of said second area; and determining the reliability of a recording operation based on a first detection signal and a second detection signal, said first detection signal being produced from sub information reproduced by said second head, said second detection signal being produced from current applied to said second head when main information is recorded in said first area wherein said first head erases said first area and records sub information in said second area at once on two tracks, said second head records main information in said first area and reproduces said second areas by means of adjacent paired heads on each track, and said second areas are at the beginning and end of said first area.

5. The recording verification method according to claim 4, wherein of said paired heads of said second head, preceding heads reproduce sub information from said second area placed at the beginning of said first area, subsequent heads reproduce sub information from said second area placed at the end of said first area, and a first detection signal is produced from said pieces of sub information.

6. The recording verification method according to claim 4, wherein after said preceding heads of said paired heads of said second head record main information, a recording leakage signal of said subsequent heads is reproduced, and a leakage signal of said preceding heads is reproduced before main information is recorded by said subsequent heads of said paired heads of said second head, thereby producing a second detection signal.

7. The recording verification method according to claim 4, wherein when said first head and said second head are different in azimuth angle, a track pitch is W, and the difference in azimuth angle is $\theta$, sub information recorded by said first head is substantially a single wavelength $\lambda$ represented by $\lambda=2\times W\times\tan\theta$.

8. The recording verification method according to claim 4, wherein while said second head reproduces sub information, current applied to said first head is interrupted or reduced.

9. The recording verification method according to claim 4, wherein said second area for recording sub information is equal to or less than 3% of said first area for recording main information.

\* \* \* \* \*